United States Patent [19]

Sutton et al.

[11] Patent Number: 4,681,685
[45] Date of Patent: Jul. 21, 1987

[54] METHOD AND APPARATUS FOR CONCENTRATING BIOPARTICLES

[75] Inventors: Paul M. Sutton, Bethel, Conn.; Joseph Peplinski, Coldwater, Canada

[73] Assignee: Dorr-Oliver Inc., Stamford, Conn.

[21] Appl. No.: 748,519

[22] Filed: Jun. 25, 1985

[51] Int. Cl.⁴ ............................................. C02F 3/08
[52] U.S. Cl. ...................................... 210/618; 210/97; 210/151; 210/189
[58] Field of Search ............... 210/618, 150, 151, 189, 210/195.1, 196, 97, 137, 614

[56] References Cited

U.S. PATENT DOCUMENTS

| | | | |
|---|---|---|---|
| 3,803,029 | 4/1974 | Blecharczyk | 210/618 |
| 3,855,120 | 12/1974 | Garbo | 210/618 |
| 4,250,033 | 2/1981 | Hickey et al. | 210/618 X |
| 4,524,139 | 6/1985 | Fuchs | 210/618 X |
| 4,534,864 | 8/1985 | Rigouard | 210/618 |

Primary Examiner—Tom Wyse
Attorney, Agent, or Firm—Paul D. Greeley

[57] ABSTRACT

A method and apparatus for controlling biomass growth in a fluidized bed reactor during anaerobic or aerobic treating of a waste feed. In particular, means is provided for concentrating a portion of bioparticles, the bioparticles being media with biomass adhered thereto and the concentrating means being integral to the fluid bed reactor, so that bioparticles delivered to a separator means for separating the biomass from the media are of high concentration requiring little downstream processing of the biomass separated thereby.

14 Claims, 4 Drawing Figures

METHOD AND APPARATUS FOR CONCENTRATING BIOPARTICLES

BACKGROUND OF THE INVENTION

The present invention relates to a method and apparatus for controlling biomass growth in a fluidized bed reactor during anaerobic or aerobic treatment of a waste feed. In particular, the present invention provides a means for concentrating a portion of bioparticles, the bioparticles being media with biomass adhered thereto and the concentrating means being integral to the fluid bed reactor, so that bioparticles delivered to a separator means for separating the biomass from the media are of high concentration requiring little downstream processing of the biomass generated therefrom.

The phenomenon of biomass growth in reactors is well known. Moreover, numerous solutions have been proposed for removing the excess biomass growth from the reactor for treatment thereof, e.g., U.S. Pat. Nos. 4,177,144 and 4,419,243, and British Patent Appl. No. 7,923,908 (filed July 9, 1979). Thus, it has been recognized that biomass growth within an anaerobic or aerobic biological fluid bed reactor must be controlled to prevent undesirable fluid bed expansion within the reactor.

In a biological expanded or fluidized bed reactor particular material (hereinafter referred to as "media") is used, such as sand, to provide a surface for biomass attachment so that the biomass may be fluidized in the reactor to interact with a waste feed to convert the waste feed into a more ecologically desirable composition. Over time, however, the biomass thickness on the media increases and the fluid bed expands. It has been found necessary to control the expansion of the fluidized bed at a certain pre-determined maximum level in order to prevent carry-over of biomass and media (hereinafter referred to as "bioparticle").

For example, British Patent Appl. No. 7,923,908 controls biomass growth by removing a fraction of the bioparticles from the top of the fluidized bed, subjecting them to a shear cell wherein supernatant liquid is removed therefrom via conduit 6 and the sheared media/biomass slurry falls into a feed hopper which can raise the slurry to a single deck vibrating sieve such that the media is returned to the fluidized bed and the biomass is exhausted as waste sludge. While satisfactory, this method of media/biomass separation results in a stream of waste sludge of relatively low concentrations of biomass often necessitating further downstream processing to allow ultimate disposal of a more concentrated byproduct. This waste sludge contains substantial amounts of waste feed liquid which has a very distasteful odor and which must be removed from the waste sludge before disposal of the excess biomass.

U.S. Pat. No. 4,177,144 discloses a controlled system to prevent the accumulation of excessive biomass in a fluidized bed reactor wherein the biomass on the media continues to grow, causing the bed to expand until its level reaches an alarming point indicative to excess growth. This point is sensed thereby activating an agitator arrangement which effects shearing of the excess biomass from the media to produce in a separator column, the column extending between the fluidized bed and the liquid effluent above the bed, a mixture of sheared material and partially stripped media. In accordance with U.S. Pat. No. 4,177,144 the media which have been sheared to remove excess biomass allegedly fall back into the bed whereas the biomass along with liquid feed is drawn off at a port provided in the separator column. This is also undesirable since the concentration of biomass being exhausted through the port of the separator is low in concentration requiring additional downstream treatment.

It has also been proposed, as shown in U.S. Pat. No. 4,419,243, that biomass growth can be controlled by providing large support structures for growing the biomass thereon whereby excess growth is prevented by removal of excess sludge from the surface of the support structure due to contact of the support structure with the internal walls of the reactor. The deficiencies of a system such as that disclosed in U.S. Pat. No. 4,419,243 are readily apparent in that the sludge is not removed from the reactor and continues to grow therein and thus results in an expanded bed.

Thus, the present inventors have come up with a method and apparatus for controlling biomass growth in a fluidized bed reactor or any anaerobic and aerobic reactor which provides an exhaust sludge high in biomass concentration and which overcomes the need for further downstream treatment of excess biomass and other deficiencies resulting therefrom.

This and other advantages of the present invention will become clear as described below.

SUMMARY OF THE INVENTION

It is a primary object of the present invention to provide a method and apparatus for removing and controlling excess biomass in a reactor. The invention is particularly drawn to the controlling of biomass growth in a fluidized bed reactor during anaerobic or aerobic treatment of a waste feed. The object of the present invention is accomplished by providing means for concentrating a portion of bioparticles prior to separating the concentrated bioparticles into media and biomass. The means for concentrating a portion of bioparticles being at least one concentrator positioned integral with the reactor.

Also, it is an object of the present invention to provide that the concentrator is disposed either within the reactor or outside of the reactor. Moreover, the concentrator is positioned at a point where the concentrator is near the maximum preferred height of the fluidized bed of the reactor. It is also an object of the present invention to provide that the concentrator be located on either the inside or outside wall of the reactor having either a conical, rectangular, cylindrical or any other shape which permits concentration of the bioparticles therein. It is preferred that the shape of the concentrator be such that substantially all the bioparticles concentrated in the concentrator are removed when removal means are activated.

In accordance with the present invention as the height of the fluid bed increases due to expanded biomass growth on the media, the bioparticles having high concentrations of biomass begin to rise to the top of the bed displacing the liquid effluent at the top of the reactor. The concentrator is positioned at a point near the preferred maximum height of the fluidized bed such that if the fluidized bed begins to expand to an undersirable height these highly concentrated bioparticles are collected within the concentrator in order to control the growth of excess biomass within the reactor. Initially, it is preferred that the out-flow valve of the concentrator be closed so that the bioparticles may collect and concentrate within the concentrator prior to removal therefrom.

Thus, it is also an object of the present invention that once the bioparticle concentration level in the concentrator reaches a certain point the out-flow valve of the concentrator is opened to allow the removal of concentrated bioparticles therefrom for treatment in a separator means, whereby biomass is separated from media. The method and apparatus as described above and further described herein provides a high biomass concentration which is exhausted from the reactor to prevent excess growth therein and minimizes any further downstream treatment of the biomass. It is a preferred embodiment of the present invention that the media which is separated from the biomass by a separator means is returned to the reactor for conservation thereof. The separator being any conventional means for separating biomass and media, e.g. a sieve bend screen or hydrocyclone.

The present invention may also include many additional features which shall be further described below.

DESCRIPTION OF THE PREFERRED EMBODIMENTS

The present invention provides a method and apparatus for concentrating excess bioparticles of a fluid bed reactor which includes a concentrator which is integral to the expanded or fluidized bed reactor prior to media/biomass separation. The method and apparatus according to the present invention results in a higher concentration of excess biomass being removed from the fluid bed reactor following media/biomass separation. Although, U.S. Pat. No. 3,853,752 shows the use of a sludge concentrator for the extraction of excess sludge from an activated sludge compartment in an aerated biological process, it neither describes nor suggests the use of a concentrator in a fluidized bed to remove excess biomass growth therefrom. To the contrary, U.S. Pat. No. 3,853,752 provides a concentrator 22 for the extraction of excess sludge in activated sludge 1. Moreover, bioparticles are contained within the second stage and do not enter concentrator 22. Concentrator 22 according to U.S. Pat. No. 3,853,752 is used to concentrate sludge before removal of the sludge through sludge outlet 23. Thus, it is readily apparent that this reference in no way discloses a concentrator according to the present invention nor does it overcome the deficiencies of the prior art.

The present invention provides for a method and apparatus for controlling biomass particle growth in a reactor or fluidized bed reactor comprising means for concentrating a portion of the bioparticles, and means for separating the concentrated bioparticles into media and biomass, such that the biomass concentration expelled from the system is high in concentration.

Figure 1:
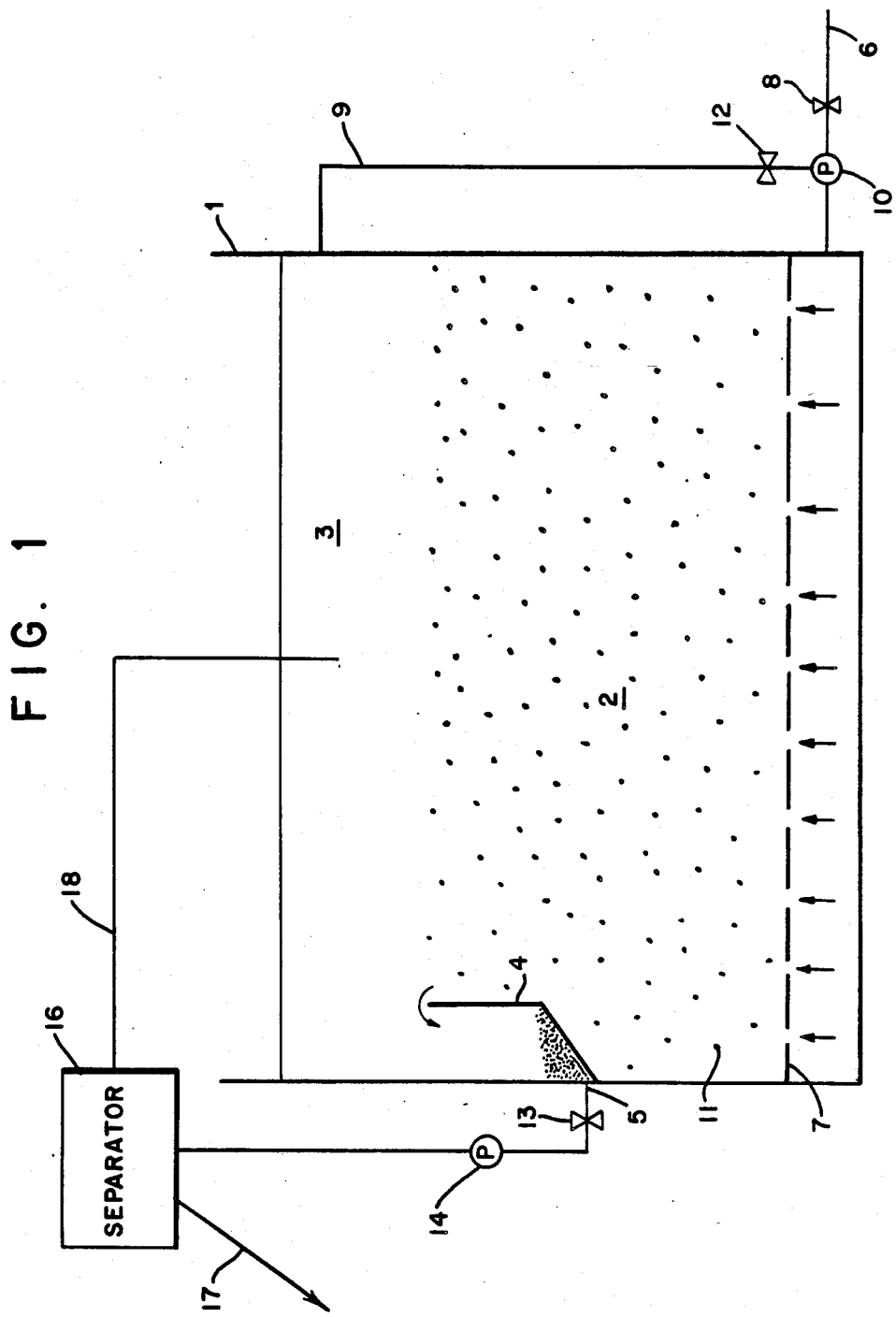
FIG. 1 is a sectional view of a reactor with a concentrator according to the present invention.

The method and apparatus for controlling and removing excess biomass growth from a fluidized bed reactor, according to one embodiment of the present invention, is demonstrated in FIG. 1. In particular, FIG. 1 provides a reactor 1 having a fluidized bed 2 and a liquid area 3. Reactor 1 may be used for either anaerobic or aerobic treatment of sewage or waste sludge. In FIG. 1, the concentrator 4 is rectangular with a sloped angle (approximately 60°) at the outlet 5 for removal of substantially all of the concentrated bioparticles contained therein. However, it is understood that any fabricated means or design structure capable of concentrating bioparticles can be used therefore. During anaerobic and aerobic treatment of the waste feed sludge, the waste feed or sludge may be introduced into the reactor 1 via conduit 6 which enters the fluidized bed 2 through distributor plate 7. It is also envisioned that the liquid effluent 3 maybe recycled via conduit 9 and pump 10 through the bottom of the reactor 1 for fluidizing of the fluid bed 2. The sludge or waste feed introduced into the reactor 1 interacts with the attached biomass (microorganisms) which have adhered to the fluidizing media, such as sand, and which form bioparticles 11 for treatment thereof. If the waste feed or sludge were being aerobically treated, the waste feed or sludge and the recycle flow would be aerated or oxygenated before it enters the reactor 1.

As the biomass grows on the media during continued interaction with the waste feed or sludge bioparticles 11 tend to grow and as bioparticles 11 grow they begin to rise upwardly in the reactor 1. Thus, it is the bioparticles having the highest concentration of biomass thereon which are preferrably removed from the system. During the course of treating waste feed or sludge fluidized bed 2 comprising waste feed or sludge and bioparticles 11 begins to expand thereby increasing the height of bed 2 within reactor 1. As indicated previously it is important to control the level of the bed 2 at a predetermined maximum level. In order to accomplish this by removing excess biomass from the reactor 1 the present inventors have inserted a concentrator 4 integrally with reactor 1. The top of concentrator 4 is open and positioned at a point near the maximum preferred height of the fluidized bed 2. As the fluidized bed 2 begins to expand due to increased biomass growth the bioparticles 11 enter concentrator 4 at the opening displacing liquid effluent 3 therefrom. The bioparticles 11 begin concentrating within concentrator 4 until the level of concentrated bioparticles 11 reaches a certain predetermined level wherein flow restricting valve 13 is opened so that the concentrated bioparticles 11 in concentrator 4 can be removed via concentrator outlet 5. The concentrated bioparticles 11 removed from concentrator 4 are pumped via pump means 14 to a separator 16; the separator being any conventional means for separating biomass from media, e.g. mechanical shear unit, sieve bend screen or hydrocyclone. Separator 16 then separates the biomass from the media, exhausting the biomass via conduit 17 for either additional downstream treatment, or when feasible explusion into the environment. It is preferable that the sheared media be recycled back to reactor 1 via conduit 18. The biomass exhausted via conduit 17 consists of a desirable level of biomass concentration.

Figure 2:
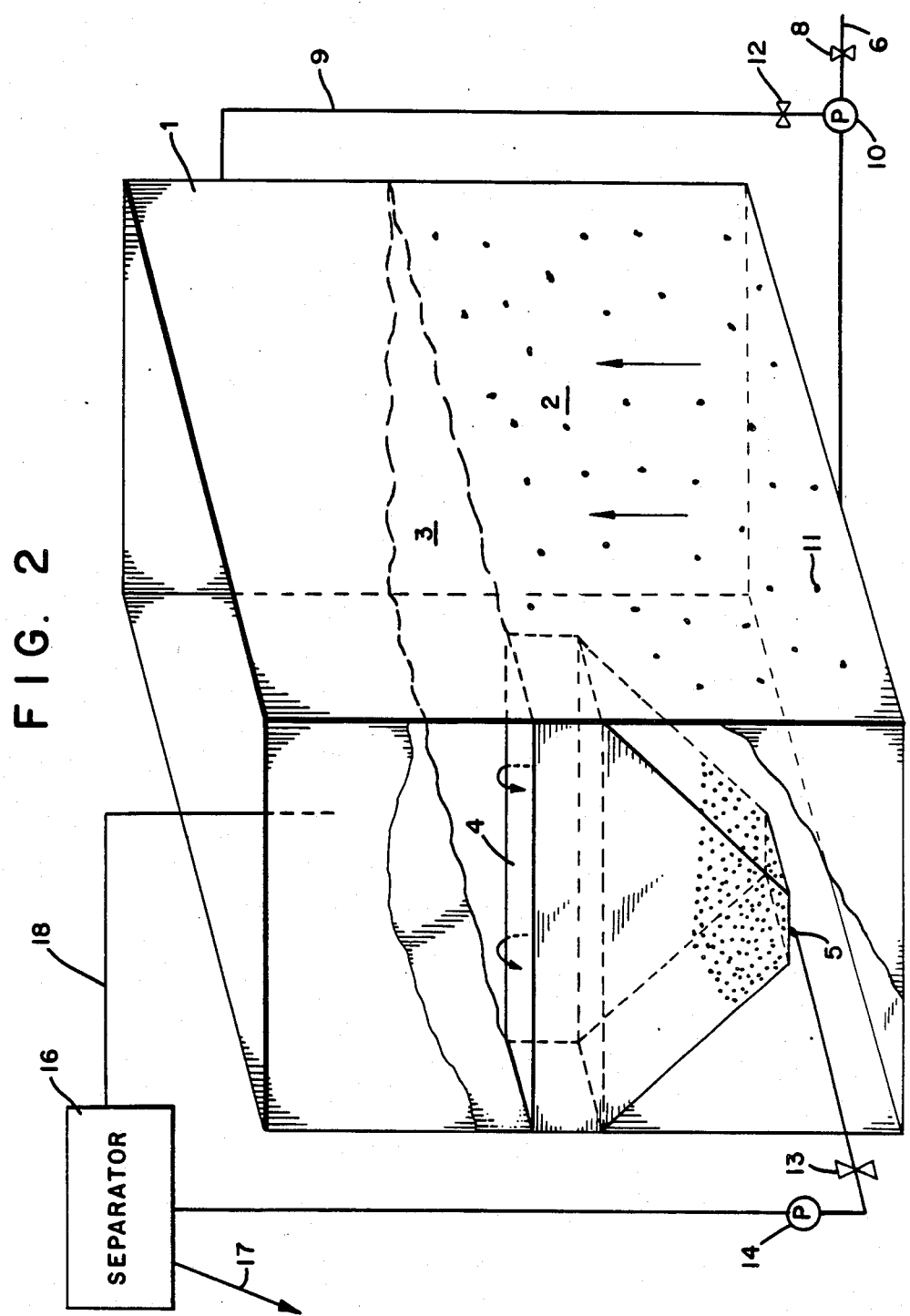
FIG. 2 is a three dimensional configuration of the reactor and concentrator as depicted in FIG. 1.

FIG. 2 is a three dimensional depiction of the reactor shown in FIG. 1.

Figure 3:
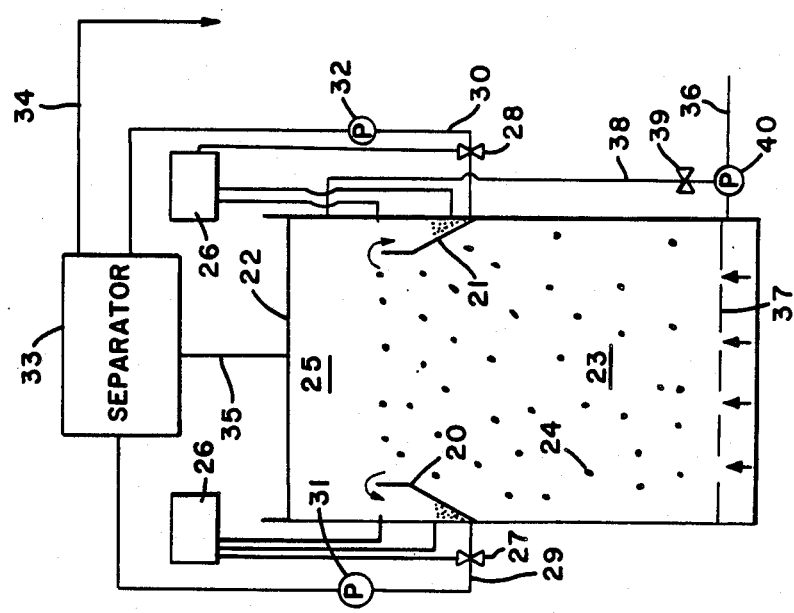
FIG. 3 is a sectional view of an embodiment according to the present invention.

FIG. 3 is another embodiment of the present invention providing multiple concentrators 20 and 21 positioned within the reactor 22 each having openings at a point near the preferred maximum height of the fluid bed 23. As the height of the fluid bed 23 rises due to excess biomass growth bioparticles 24 enter concentrators 20 and 21 displacing liquid effluent 25 therefrom. When the bioparticles 24 reach a certain predetermined level within concentrators 20 and 21 sensor means 25 and 26, respectively, (a single sensor may be used if desired) signal flow restricting valves 27 and 28 to open conduits 29 and 30 for removal of the concentrated bioparticles 24 from concentrators 20 and 21. The concentrated bioparticles 24 are pumped via conduit 29 and 30 by pumping means 31 and 32, respectively, to separator 33 for separation of biomass and media. The biomass being exhausted from the system via conduit 34 whereas the media is returned to the reactor 22 via conduit 35. In FIG. 3 waste feed or sludge can be introduced via conduit 36 into reactor 22 via distributor 37. Also, liquid effluent 25 may be recycled via conduit 38. Pump 40 is provided to recirculate the liquid effluent 25 and introduction of waste feed to fluidizing bed 23. This invention also provides that one single concentrator may be positioned along the entire interior wall of reactor 22.

Figure 4:
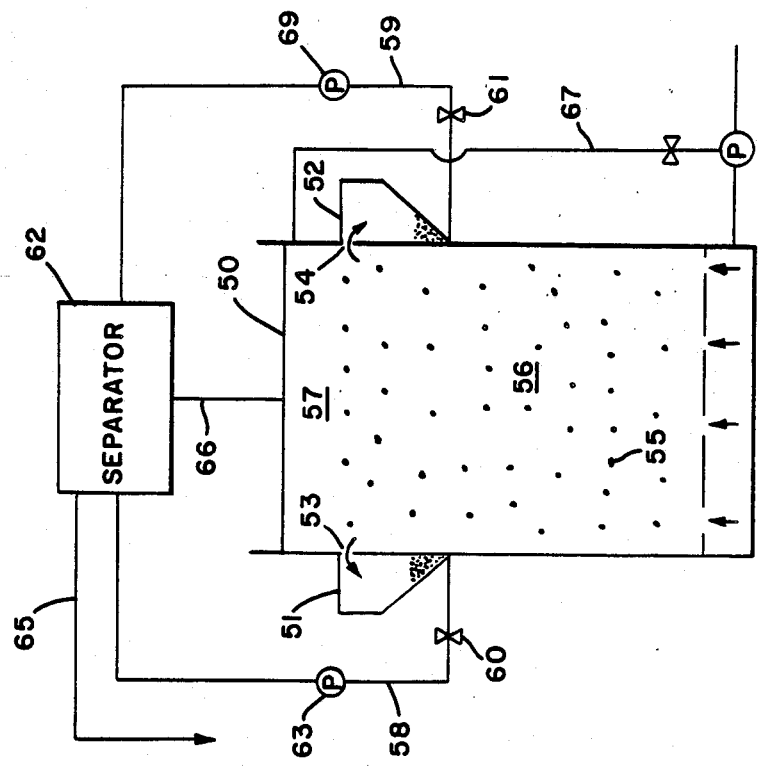
FIG. 4 is a sectional view of another embodiment according to the present invention.

FIG. 4 provides a reactor 50 comprising concentrators 51 and 52 positioned on the exterior walls thereof. A single concentrator could also be positioned along the entire exterior wall of reactor 50. Concentrators 51 and 52 have orifices 53 and 54, respectively, for introduction of bioparticles 55 from fluidized bed 56 for concentrating thereof. Again, the liquid effluent 57 is displaced in the concentrators 51 and 52 as bioparticles 55 concentrate therein. The concentrated bioparticles 55 are removed from concentrators 51 and 52 via conduits 58 and 59, respectively, upon the opening of flow restricting valves 60 and 61. Concentrated bioparticles 55 being pumped to separator 62 by pumping means 63 and 64. Similar to FIG. 3 the separator 62 separates biomass from the media exhausting the biomass via conduit 65 and returning the media to the reactor 50 via conduit 66. The liquid effluent 67 may be recycled via conduit 67.

EXAMPLE

An aerobic fluid bed reactor Oxitron TM (a trademark of Dorr-Oliver, Inc.), similar to that depicted in FIG. 2, was operated to obtain a bed of bioparticles. The fluidized bed had a height of 195 inches. A test sample was extracted 6 inches below the top of the fluidized bed having the following concentrations:
Bioparticle concentration—33,039 mg/l
Biomass concentration—7,316 mg/l
These are the concentrations at which the prior art have normally been extracted from the reactor in order to prevent excess biomass growth.

The present inventors simulated bed growth, since it may take many days before actual bed growth, by designing a concentrator which can be lowered into the fluidized bed for concentrating bioparticles therein. Thereafter the concentrator was lowered into the fluid bed to a point where the opening of the concentrator was 6 inches below the top of the fluidized bed. A very thick concentration of bioparticles was observed in the concentrator. The following test data was obtained:
Bioparticles concentration—98,700 mg/l
Biomass concentration—23,100 mg/l
Comparison of the test results demonstrates a substantial difference in bioparticle and biomass concentrations between the prior art method of simple extraction and the present invention using a concentrator. Thus showing that the use of the concentrator according to the present invention results in the bioparticle and biomass concentrations being approximately three times that of the concentrations of the bioparticles and biomass extracted from the reactor in accordance with the prior art.

What is claimed is:

1. A method for controlling biomass growth in a reactor comprising:
    concentrating a portion of bioparticles in said reactor by means of at least one concentrator positioned within said reactor and disposed on the inside wall of said reactor such that an opening of said concentrator is positioned substantially at a point near the maximum preferred height of the fluidized bed in said reactor said bioparticles being a media with biomass adhered thereto; and
    removing the concentrated bioparticles from said concentrator to a separating means for separation of said concentrated bioparticles into media and biomass.

2. A method in accordance with claim 1, wherein said bioparticles collect and concentrate within said concentrator when said fluidizing bed approaches or exceeds said point near the maximum preferred height of said fluidizing bed.

3. A method in accordance with claim 2, wherein said bioparticles collected in said concentrator are extremely high in concentration.

4. A method in accordance with claim 2, wherein a sensor means is provided in said concentrator to open and close a flow restricting valve to permit removal and collection of the concentrated bioparticles of said concentrator.

5. A method in accordance with claim 1, wherein said separating means is a mechanical shearing device, a sieve bend screen or a hydrocyclone.

6. A method in accordance with claim 1, wherein means are provided for recycling said media back to said reactor after separation from said biomass.

7. A system for controlling biomass growth comprising:
    a reactor comprising feed material, bioparticles for fluidizing and treating said feed material, said bioparticles being media with said biomass adhered thereto, and at least one concentrator positioned within said reactor and disposed on the inside wall of said reactor such that an opening of said concentrator is positioned substantially at a point near the maximum preferred height of the fluidized bed in said reactor for concentrating said bioparticles; and
    a separator in communication with said concentrator for removing concentrated bioparticles from said concentrator and separating said concentrated bioparticles into media and biomass.

8. A system according to claim 7, wherein pumping means are provided for removing and transporting the concentrated bioparticles from said concentrator via a conduit to a separator for separating said bioparticles into media and biomass.

9. A system according to claim 8, wherein said conduit for transporting said concentrated bioparticles from said concentration to said separator includes a flow restricting valve.

10. A system according to claim 9, wherein said flow restricting valve is operated by sensing means in said concentrator.

11. A system according to claim 7, wherein said separator is a mechanical shearing device, a sieve bend screen or a hydrocyclone.

12. A system according to claim 7, including means for recycling the separated media to said reactor.

13. A system according to claim 7, including means for recycling liquid at the top of said reactor to the distributor area of said reactor for fluidizing the bed of said reactor.

14. A system in accordance with claim 7, wherein said concentrator extends completely around the inner circumference of the said reactor.

* * * * *